INVENTOR.
HARRISON W. FULLER

INVENTOR.
HARRISON W. FULLER

United States Patent Office 3,366,937
Patented Jan. 30, 1968

3,366,937

THIN FILM MAGNETIC MEDIUM HAVING REGIONS OF VARYING COERCIVE FORCE

Harrison W. Fuller, Needham Heights, Mass., assignor to Laboratory for Electronics, Inc., Boston Mass., a corporation of Delaware Filed Feb. 19, 1964, Ser. No. 345,967
3 Claims. (Cl. 340—174)

ABSTRACT OF THE DISCLOSURE

A device for shifting magnetic domains, polarized in either one of two directions, in discrete steps along a magnetic medium. The magnetic medium is prepared with a repetitive pattern of regions of varying coercive force and a magnetic field having a time varying amplitude, with a time base related to the spacing between coercive force regions, is applied to the medium to propagate the magnetic domains along it.

Figure 1:
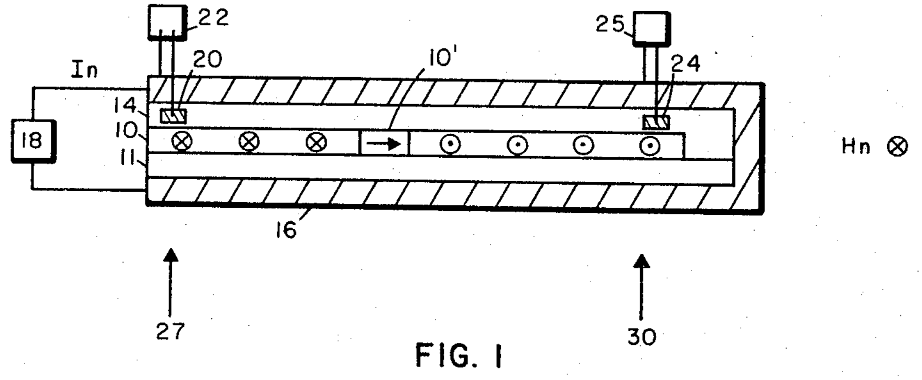

This invention relates in general to magnetic devices and in particular to digital memory and logic devices utilizing a magnetic medium having a preselected sequence of regions therein of varying coercive force.

A great quantity of research has been recently carried on in the field of shift registers, counters, and delay devices. The main goals of this effort have been to increase data density and switching speed and to reduce power requirements. One class of devices this developed consists of a sequence of vacuum tubes, transistors, or magnetic or other binary storage devices interconnected in a linear array with wire and passive components; these devices are driven by pulses that allow information to be inserted in the input end and propagate the information down the array toward a reading end. Since these devices generally consist of an assembly of discrete components, they are large and expensive to fabricate. Although many of these devices may be fabricated using integrated microelectronic techniques, they all have the ultimate disadvantage of requiring power to be furnished at all stages in an information stepping operation even though the information is only available at the output.

A second class of devices consists of acoustic delay lines or rotating magnetic recording devices for sequential access memory. Acoustic delay lines have the disadvantages of low data density due to dispersion and of requiring continuous operating power because of their dynamic nature which necessitates recirculation for storage and memory functions. While rotating magnetic recording devices do not lose their information content if there is a loss of power, nonetheless continuous operation is almost always required; in addition the inherent mechanical mode of operation ultimately causes wear and unreliability.

A third class of magnetic devices employs a continuous magnetic material of a predetermined magnetic characteristic in which a discrete zone is controllably propagated along the length of the medium. An early embodiment of this type of device is illustrated by U.S. Patent No. 2,919,432 entitled, "Magnetic Device," issued Dec. 29, 1959. In this patent, a discrete zone is propagated in a magnetic medium by a number of shaped electrical conductors which when discretely energized serve to step the zone down the medium. Since the distance the zone is stepped each time depends on the structure of the various conductors, the data density of the device is limited by the fabrication techniques of the multilayer package, the shielding of one conductor by another, and the spreading of the magnetic field of each stepping strip. A recent and more sophisticated version of a magnetic shift device is illustrated in U.S. Patent No. 3,114,898 entitled, "Magnetic Interdomain Wall Shift Register," issued Dec. 17, 1963, and assigned to the same assignor as this application. In this device, sheet conductors are used to provide uniform magnetic fields over the entire structure, while the domain wall motion in the magnetic medium is controlled by the magnetostatic interaction forces between the domain wall and control regions in adjacent magnetic media and the sequential application of the uniform magnetic fields. While this device allows greater data density because of the absence of shaped conductors, it still requires a plurality of conductors to propagate the domain wall and to regulate the magnitude and polarity of the magnetostatic interaction forces; in addition more than one magnetic medium is required.

Accordingly it is the primary object of the present invention to provide a new and novel digital memory and logic device utilizing a magnetic medium.

It is another object of this invention to provide a shift register having low power requirements, fast switching speed and high data storage density.

It is a further object of this invention to provide a shift register which does not require standby power to be operative and immediately available.

It is another object of the invention to provide a shift register having a single magnetic medium and which is not limited in data density by a shaped conductor.

In the present invention, a magnetic medium is employed which is characterized by a coercive force which varies along the length of the magnetic medium in a preselected manner. Since the velocity of propagation of a domain wall in a magnetic medium is a function of the difference between an externally applied field and the coercive force of the medium, the motion of the domain wall and the distance of propagation can be controlled by the varying coercive force and a uniformly applied external field. In this manner, the device can function as a shift register, a counter, a delay device, or a memory unit merely by introducing a domain wall at its input end, controlling its motion along the magnetic medium, and sensing its presence at the output end.

These and other features of the invention, together with further objects and advantages thereof, will become apparent from the following detailed specification with reference to the accompanying drawings in which:

FIG. 1 illustrates a cross-sectional and exaggerated view of a preferred embodiment of the invention.

Figure 2A:
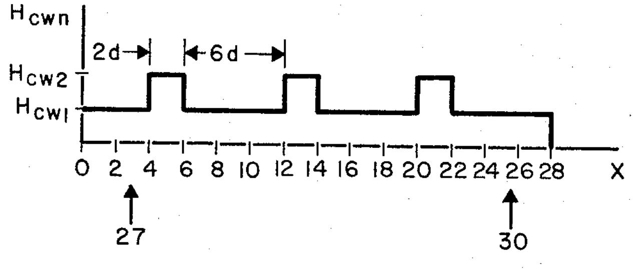
Figure 2B:
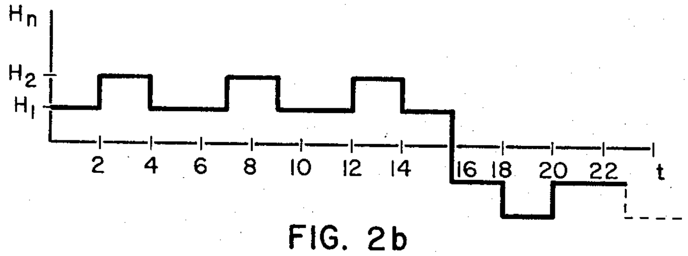
Figure 2C:
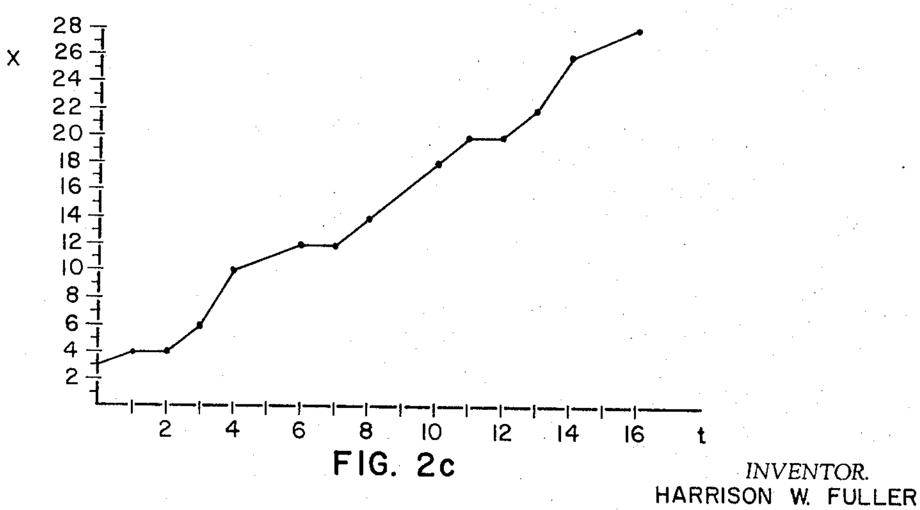

FIGS. 2*a–c* illustrate one method of operation of the embodiment shown in FIG. 1.

Figures 3A, 3B:
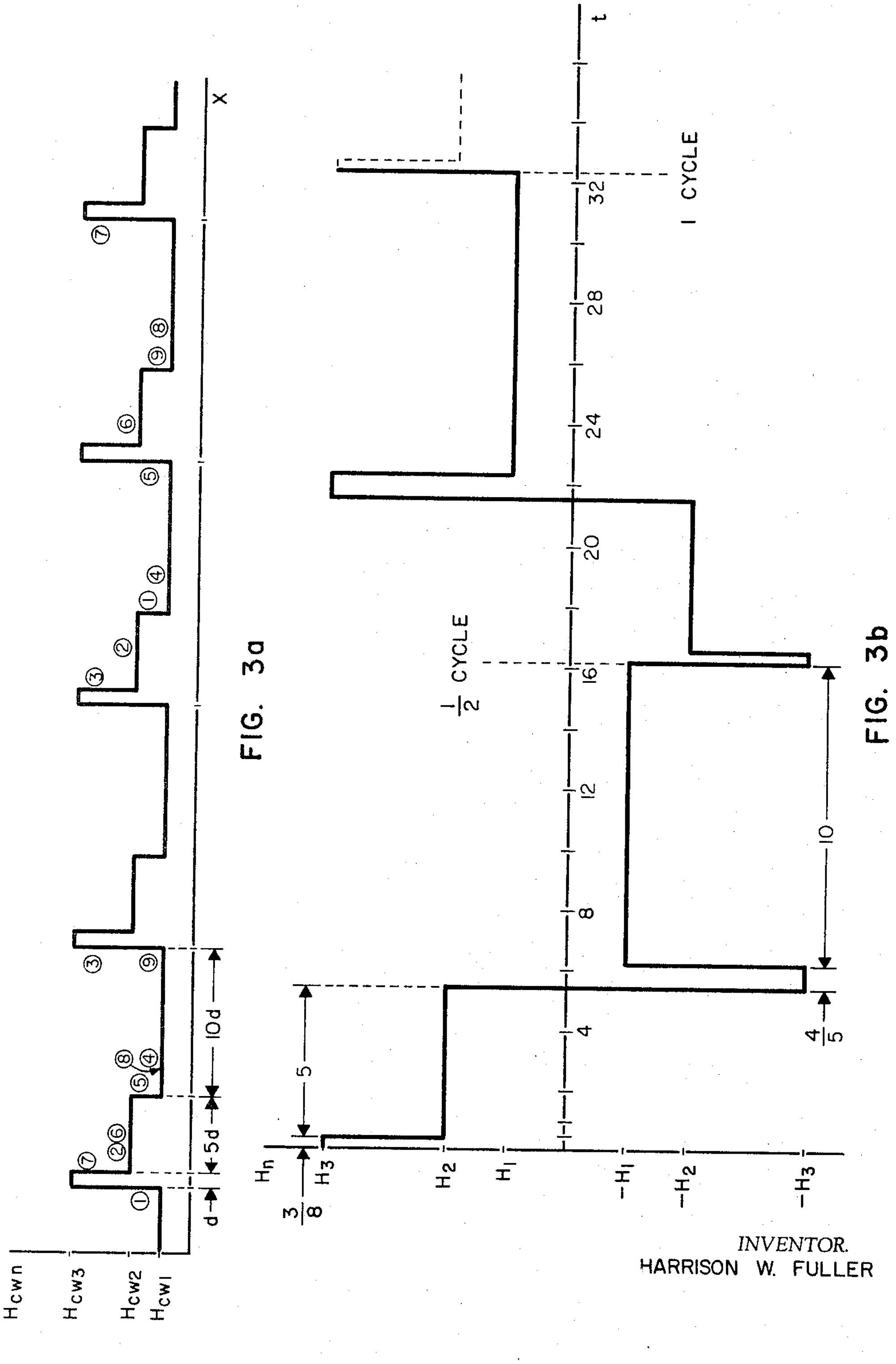

FIGS. 3*a, b* illustrate a second method of operation of the embodiment shown in FIG. 1.

In FIG. 1, a magnetic medium 10 having an easy direction of magnetization normal to the plane of the drawing is shown on a supporting substrate 11. The magnetic medium 10 may consist of a thin film of a ferromagnetic material, such as Fe, Ni, Co, or various combinations thereof, between 10 A. and 10,000 A. in thickness, and the supporting substrate 11 may be a sheet of glass or some other insulating medium. The magnetic medium 10 is encircled by a conducting medium 16, which may, for example, be a sheet conductor, and which, when energized by current $I_n$ generated by current generator 18, creates a magnetic driving field $H_n$ normal to the plane of the drawing and parallel to the easy direction of magnetization of the magnetic medium 10; the field $H_n$ is also confined to the region enclosed by the conducting medium 16. A conductor 20 is energized by a current source 22 to nucleate domain walls, such as domain wall 10′, which are propagated along the magnetic medium 10 by the driving field $H_n$ and detected at the output end by conductor 24 connected to detector 25. The domain walls are generated in a region denoted by arrow 27 and detected in a region denoted by arrow 30. The domain walls 10′ may be of the Bloch Néel or crosstie variety depending on many factors, as, for example, the thickness of the magnetic medium 10 and the type of magnetic material used; in addition, there may be more than one set of conductors 24 and detectors 25 to provide for multiple output taps. The conductors 20 and 24 are insulated from the magnetic medium 10 and the conducting medium 16 by an insulating medium 14, such as silicon dioxide. The substrate 11 may be replaced by a film of silicon dioxide if the conducting medium 16 can itself support the magnetic medium 10; it should also be noted that the magnetic medium 10 need not be insulated from the conducting medium 16 and the conductors 20 and 24 so long as appreciable atomic diffusion does not occur between the respective media.

As stated heretofore, the magnetic medium 10 is characterized by a coercive force which varies along the length thereof in a preselected manner; it is desirable for the magnetic medium 10 to have an easy-direction of magnetization at right angles to the direction of propagation of walls. Several techniques may be employed to achieve a desired coercive force pattern in the magnetic medium 10 varying both spacially and in magnitude. One technique is to control the roughness characteristic of the substrate material since a rougher substrate causes the magnetic medium 10 to have a greater coercive force; the substrate may be physically roughened by scribing techniques, photo-etching techniques, or by vacuum depositing roughening material through a mask. Another technique is to treat the magnetic medium 10 by deposition and diffusion techniques; deposition of copper or aluminum followed by subjection of the magnetic medium 10 to elevated temperatures causes an increase in the coercive force in the region of diffusion. An example of a coercive force pattern is shown in FIG. 2*a*, where the coercive force $H_{cwn}$ is plotted as a function of distance X along the magnetic medium 10. The coercive force $H_{cwn}$ is seen to vary periodically and assume the values $H_{cw1}$ and $H_{cw2}$, illustrated here as step functions.

In the operation of the device, the domain wall 10′ generated by current source 22 and conductor 20 in the region denoted by arrow 27, is propagated to the right by driving field $H_n$ which reverses the direction of magnetization of the portion of the magnetic medium 10 immediately preceding the domain wall 10′. Since the magnetic field needed to nucleate new domain walls in a magnetic medium is up to ten times greater than the field needed to overcome the coercive force in a magnetic medium (composed of, for example, 75% Ni—15% Fe—10% Co) and propagate an existing domain wall, the driving field $H_n$ can assume a large range of values without nucleating new domains. A more detailed exposition of the generation and propagation of domain walls is illustrated by the aforementioned U.S. Patent No. 3,114,898 (FIGS. 3 and 4 in particular). The velocity of propagation and the distance moved by the domain wall 10′ in the magnetic medium 10 is given by:

$$V=R(H_n-H_{cwn})$$

$$X=R(H_n-H_{cwn})t$$

where R is the wall mobility, $H_n$ is the externally applied driving field, and $H_{cwn}$ is the wall coercive force. It is thus seen that the distance the domain wall 10′ moves in the magnetic medium 10 is proportional to the product of the difference between the driving field $H_n$ and the wall coercive force $H_{cwn}$ and the length of time the driving field $H_n$ is applied. For the purpose of illustrating the method of operation of the present invention, it has been assumed in reference to FIGS. 2 and 3 that $H_{cw2}=2H_{cw1}$, $H_{cw3}=2H_{cw2}$ and $H_n=1.5H_{cwn}$. Under these assumptions, a domain wall in a region of coercive force $H_{cw1}$ propagated by a driving field $H_1$ will move a distance $.5H_{cw1}R$ in unit time. If this expression is taken as a basic unit of distance *d*, then driving field $H_2$ operating in regions of coercive force $H_{cw2}$ and $H_{cw1}$ will propagate a domain wall a distance 2*d* and 4*d* respectively in unit time; similarly driving field $H_3$ operating in regions of coercive force $H_{cw3}$, $H_{cw2}$, $H_{cw1}$ will propagate a domain wall a distance 4*d*, 8*d*, and 10*d* respectively in unit time.

Referring now to FIGS. 2*a–c*, a driving field $H_1$ is applied at zero time when the domain wall 10′ is in position 3; if $H_1$ is applied for two units of time, the domain wall 10′ will move a distance *d* to position 4 in one unit of time and be stopped there by the region of higher coercive force $H_{cw2}$. At time $t=2$, a driving field $H_2$ is applied in order to move the domain wall 10′ through the region of higher coercive force $H_{cw2}$; if $H_2$ is applied for 2 units of time, the domain wall 10′ will move a distance 2*d* in one unit of time through region $H_{cw2}$ and a distance 4*d* in the second unit of time through region $H_{cw1}$, coming to rest at $X=10d$. At $t=4$, driving field $H_1$ is reapplied for three units of time and the domain wall 10′ moves a distance 2*d* to position 12 where it is once again stopped by a region of higher coercive force $H_{cw2}$. By repetition of such a driving sequence, the domain wall 10′ is stepped along the length of the magnetic medium 10, passes under the conductor 24 ($X=26$) at $t=14$ to be detected, and is propagated off the end ($X=28$) of the magnetic medium 10 at 6=16. Since the direction of magnetization of the magnetic medium 10 has been completely reversed by the driving field $H_n$, the driving field must be reversed in polarity to step a new domain along the length of the magnetic medium 10.

With the type of varying coercive force $H_{cwn}$ shown in FIG. 2*a*, the invention can be used for signalling the passage of a preset number of pulses in an electronic apparatus. Since the coercive force pattern is symmetrical, a reversal in polarity of the driving field $H_n$ will cause the domain wall 10′ to proceed to the left, that is from the output end to the input end; because of this property, the invention could be utilized to subtract two non-coincident pulse sequences and the domain wall 10′ would not appear at the output end of the magnetic medium 10 until the cumulative difference of the number of pulses in the first and second sequences became equal to the number of steps required to move the domain wall 10′ the length of the magnetic medium 10.

Because of the symmetry of the coercive force pattern shown in FIG. 2*a*, however, it is not possible to propagate more than one domain wall 10′ to the left (or right) at the same time. This problem is obviated by the slightly more complicated coercive force pattern shown in FIG. 3*a* and the accompanying driving field sequence shown in FIG. 3*b*; the magnetic medium 10 is composed of three regions of coercive force ($H_{cw3}$, $H_{cw2}$ and $H_{cw1}$) which periodically repeat along the length of magnetic medium 10. The movement of the domain walls 10′ under the applied driving field $H_n$ is illustrated by the encircled numbers in FIG. 3*a*. The two domain walls 10′ illustrated, left and right, begin a cycle positioned adjacent the regions of coercive force $H_{cw3}$ and $H_{wc2}$ respectively (position 1). A driving field $+H_3$ is applied for ⅜ units of time and causes the right domain wall 10′ to move a distance 3*d* to the left in region of coercive force $H_{cw2}$ and the left domain wall 10′ to move to the right a distance *d* in region of coercive force $H_{cw3}$ and a distance *d* in region of coercive force $H_{cw2}$ (position 2). A driving field $+H_2$ is then applied for 5 units of time causing the right domain wall 10′ to propogate to the left up to region of coercive force $H_{cw3}$ and the left domain wall 10′ to propagate to the right up to region of coercive force $H_{cw3}$ (position 3). Since driving field $+H_2$ cannot propagate a domain wall in region of coercive force $H_{cw3}$ both the domain walls 10′ are stopped by such a coercive force barrier; although only 4.5 units of time are needed to position the left domain wall 10 adjacent region of coercive force $H_{cw3}$, 5 units of time are used to assure proper positioning and increase the fabrication tolerances. A driving field $-H_3$ is then applied for ⅘ units of time and causes the left domain wall 10' to proceed a distance $8d$ to the left in region of coercive force $H_{cw1}$ and the right domain wall 10' to proceed to the right a distance $5d$ in region of coercive force $H_{cw2}$ and a distance $1\frac{3}{4}d$ in region of coercive force $H_{cw1}$ (position 4). Finally, a driving field $-H_1$ is applied for 10 units of time and causes the left domain wall 10' to move to the left a distance $2d$ in region of coercive force $H_{cw1}$ and the right domain wall 10' to move to the right a distance $8\frac{1}{4}d$ in region of coercive force $H_{cw1}$ (position 5); for the same reasons as previously given, 10 units of time are used even though only $8\frac{1}{4}$ units of time are actually necessary. The same tolerance considerations that cause greater units of time to be used also cause larger driving fields to be used, such as $-H_3$ in going from position 3 to position 4 instead of $-H_2$ as ideally required. Since the regions of coercive force $H_{cwn}$ do not have abrupt edges, a domain wall placed adjacent to a region of coercive force $H_{cwn}$ may require a driving field $H_n$ to move the domain wall away from the region of coercive force $H_{cwn}$; a driving field $H_n$ is always required, of course, to move a domain wall through a region of coercive force $H_{cwn}$. In addition, a larger driving field $H_n$ will move a domain wall quicker in a region of lower coercive force $H_{cw}(n-1)$ and, therefore, the time required for a cycle is lessened.

Since position 5 is the converse of position 1, i.e. the left domain wall 10' moving to the left adjacent region of coercive force $H_{cw2}$ and the right domain wall 10' moving to the right adjacent region of coercive force $H_{cw3}$, a sequence of driving fields $H_n$ opposite in polarity to those previously applied will move the left and right domain walls 10' to positions 6, 7, 8 and 9 exactly as described before with "right domain wall" replaced by "left domain wall" and vice-versa. A half-cycle is completed in 16.175 units of time and a full cycle is completed in 33.35 units of time. At position 9 the right and left domain walls 10' are relatively in the same place as position 1 but advanced one period of the regions of coercive force $H_{cwn}$. With the varying coercive force pattern and the driving field sequence shown in FIGS. 3*a*, *b*, a sequence of domain walls, two coercive force distributions apart, can be unidirectionally propagated along the length of magnetic medium 10. Information can be propagated along the length of magnetic medium 10 by controlling the spacing of the domain walls generated by current source 22 and conductor 20. If R has a value of $10^5$ cm./sec.–oe, $H_{cw1}$ is one oersted, and the coercive force distribution has a period of 100/cm., the information density will be 50/cm. for "non-return to zero" information and the bit rate will be approximately 1.25 megacycle per second. The power required to propagate the domain walls would be approximately 10 milliwatts for a 30 mil wide magnetic film and a current of 250 milliamperes through a metallic film driving conductor of 0.1 ohms (for 1000 NRZ bits).

Although the regions of varying coercive force have been illustrated as a periodically repeating sequence, any sequence of coercive force regions can be utilized as long as the values of the driving fields $H_n$ and the length of time applied are appropriately chosen. It is obvious that a multiplicity of conducting media could be used, if desired, to supply the driving fields $H_n$. The readout conductor could be a wire loop in which a current is generated when a domain wall passes under it, i.e. when the direction of magnetization of the magnetic medium under it is reversed. The magnetic medium, in addition, can assume a variety of shapes other than that illustrated; for example, the magnetic medium could be in the form of a helix wound on a circular conductor a few mils in diameter, thus providing a compact, high capacity register, free from edge effects and requiring less current and power than a flat medium. Since the current generator 18, the current source 22, and the detector 25 are standard modules well known in the art, no attempt has been made to explain them in detail.

Having thus described the invention, it will be apparent that numerous modifications and departures, as explained above, may now be made by those skilled in the art and which fall within the scope of the invention. Consequently, the invention herein disclosed is to be construed as limited only by the spirit and scope of the appended claims.

What is claimed is:

1. A magnetic device comprising:

a magnetic medium having a repetitive pattern of regions therein of varying coercive force, successive regions defining a path of propagation for magnetic domains:

means for establishing domains at one end of said path;

driving means for propagating one or more of said domains along the length of said path; and output means for detecting the presence of said domains at the opposite end of said path and for giving an output signal in response thereto, said driving means including means for producing a magnetic field acting over the entire medium, said field having a specific pattern of time variation, the duration of one cycle of said pattern being related to the spacing between said successive regions of varying coercive force such that said domains are advanced along said path in discrete steps defined by said regions of varying coercive force.

2. A device in accordance with claim 1 wherein the intensity and direction of said magnetic field vary with time in said specific pattern, each entire cycle of said pattern being sufficient to propagate all of the domain defining walls in said medium from one position in said medium characterized by a specific value of coercive force to another position characterized by the same value of coercive force but displaced from said first position.

3. A device in accordance with claim 2 wherein each cycle of said repetitive pattern of regions of varying coercive force is characterized by an asymmetrical variation in coercive force along the axis of propagation.

References Cited

UNITED STATES PATENTS

| | | | |
|---|---|---|---|
| 3,114,898 | 12/1963 | Fuller | 340—174 |
| 3,230,515 | 1/1966 | Smaller | 340—174 |
| 3,248,713 | 4/1966 | Middelhoek | 340—174 |

BERNARD KONICK, *Primary Examiner.*

JAMES W. MOFFITT, STANLEY URYNOWICZ, *Examiners.*

R. MORGANSTERN, *Assistant Examiner.*